April 9, 1940.　　　　F. A. LANE　　　　2,196,216
INTERNAL COMBUSTION ENGINE
Filed Jan. 14, 1937　　　5 Sheets-Sheet 2

Fred A. Lane.
INVENTOR
BY Victor J. Evans & Co.
HIS ATTORNEYS

April 9, 1940.   F. A. LANE   2,196,216
INTERNAL COMBUSTION ENGINE
Filed Jan. 14, 1937   5 Sheets-Sheet 3

Fred A. Lane.
INVENTOR
BY Victor J. Evans & Co.
HIS ATTORNEYS

April 9, 1940.                F. A. LANE                2,196,216
                     INTERNAL COMBUSTION ENGINE
                        Filed Jan. 14, 1937        5 Sheets-Sheet 4
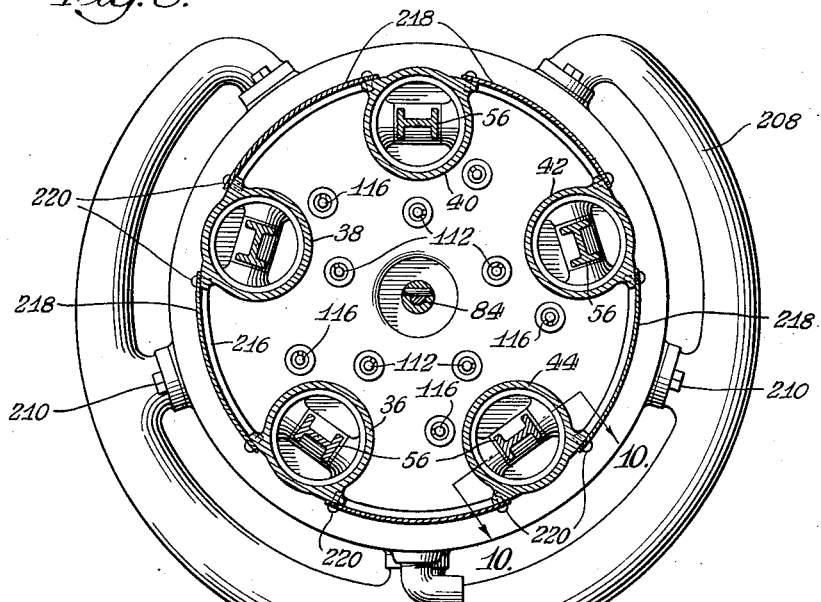
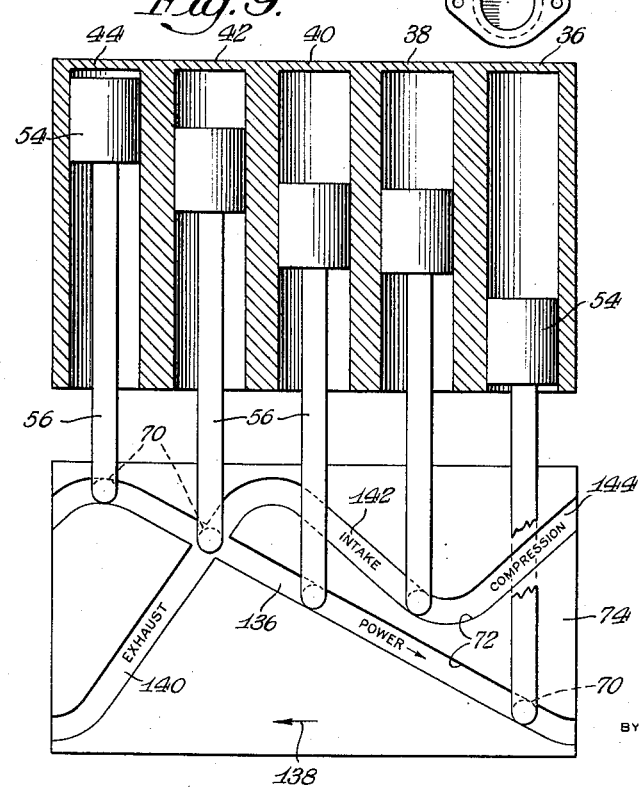
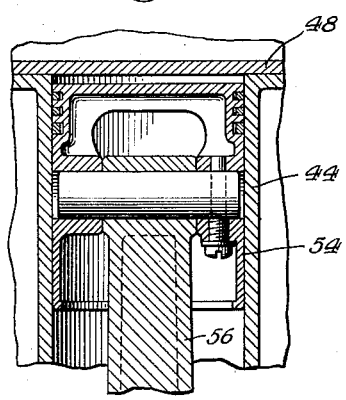
Fred A. Lane.
INVENTOR
BY Victor J. Evans & Co.
HIS ATTORNEYS April 9, 1940. F. A. LANE 2,196,216
INTERNAL COMBUSTION ENGINE
Filed Jan. 14, 1937 5 Sheets-Sheet 5
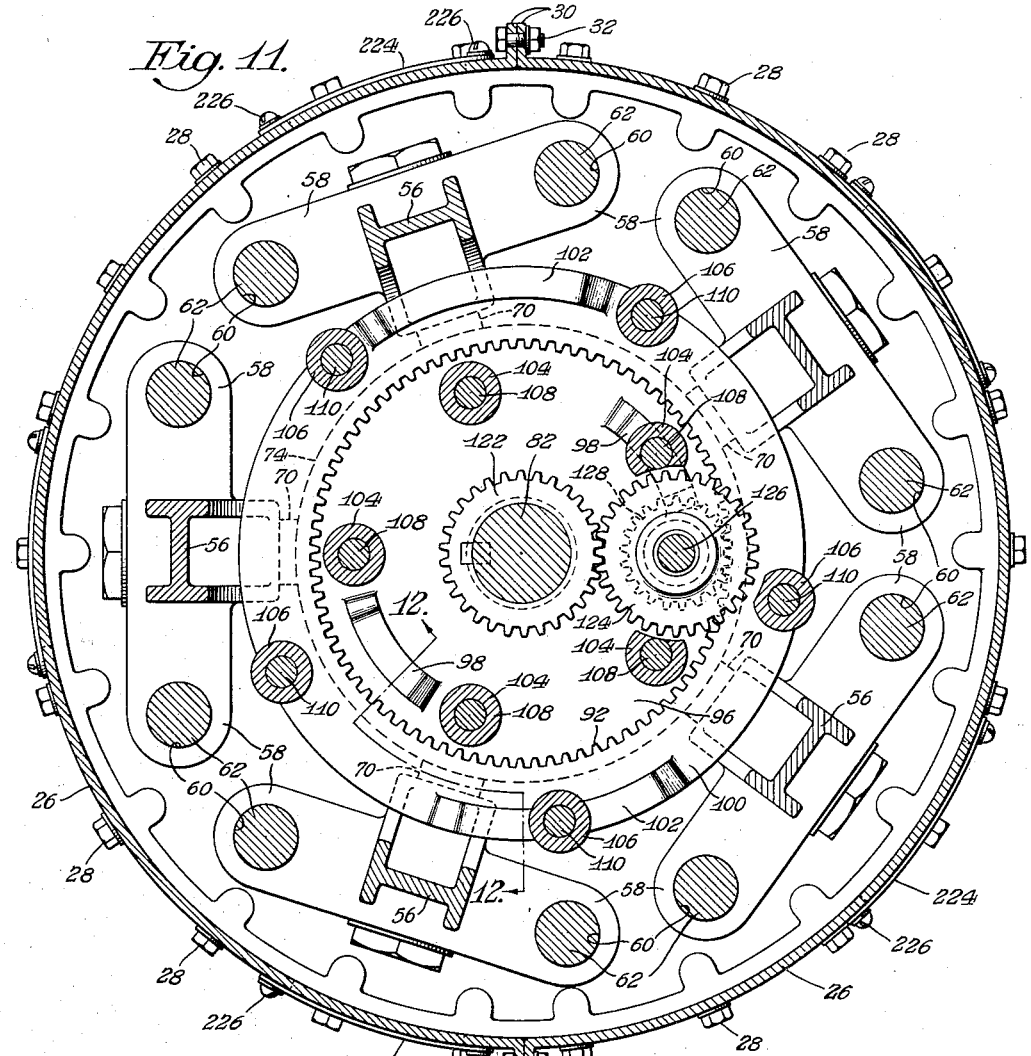
Fig. 11.
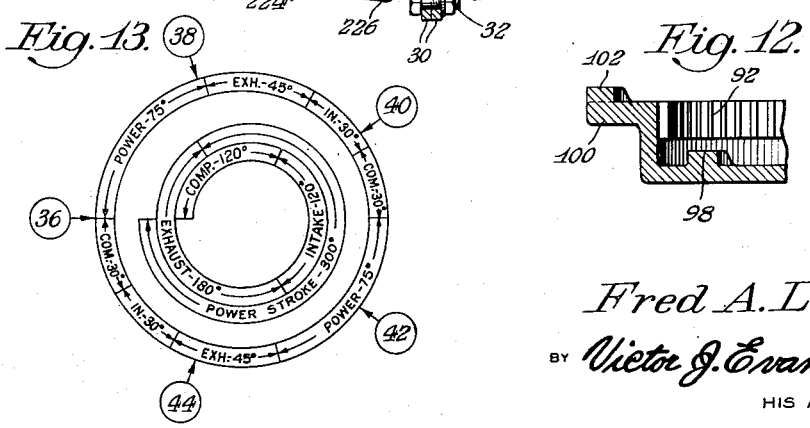
Fig. 13.
Fig. 12.
Fred A. Lane
INVENTOR
BY Victor J. Evans & Co.
HIS ATTORNEYS Patented Apr. 9, 1940

2,196,216

UNITED STATES PATENT OFFICE 2,196,216

INTERNAL COMBUSTION ENGINE

Fred A. Lane, Bloomington, Ind.

Application January 14, 1937, Serial No. 120,573

5 Claims. (Cl. 74—57)

My invention relates to internal combustion engines, and includes among its objects and advantages the provision of novel means whereby power is delivered from each piston to the power take off shaft throughout substantially the complete rotation of the latter.

In the accompanying drawings:

Fig. 8 is a sectional view along the line 8—8 of Fig. 1;

Fig. 9 is a diagrammatic view illustrating the manner in which power is delivered to the rotor;

Fig. 10 is a sectional view along the line 10—10 of Fig. 8;

Fig. 11 is a sectional view along the line 11—11 of Fig. 1;

Fig. 12 is a sectional view along the line 12—12 of Fig. 11; and

Fig. 13 is a diagrammatic view illustrating the compression, exhaust, and power phases of the invention.

Figure 1:
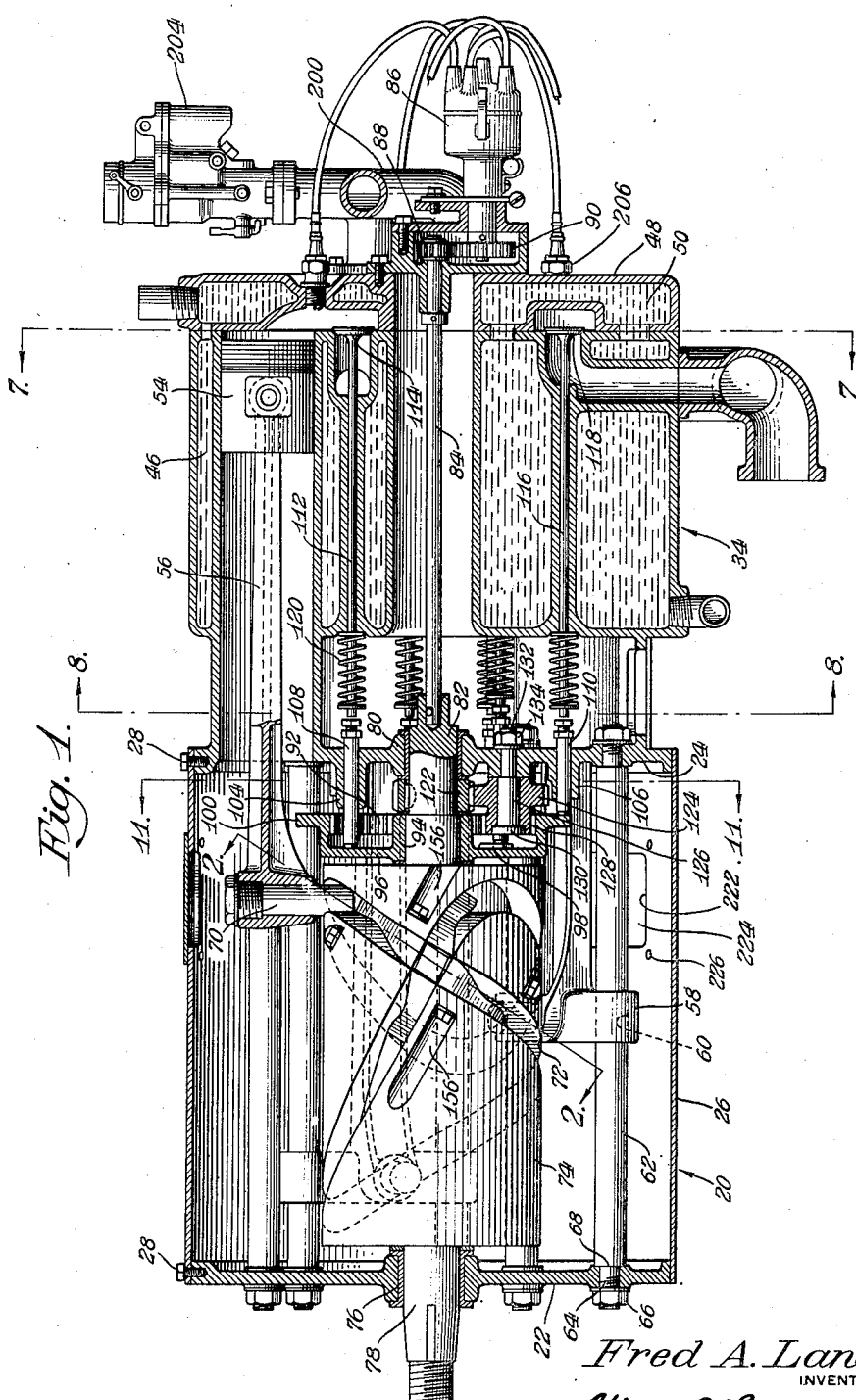
Fig. 1 is a sectional view of an engine embodying my invention.

In the embodiment selected to illustrate my invention, I make use of a base structure 20 comprising plates 22 and 24 to the peripheries of which I attach a shell 26 by means of bolts 28. I prefer to make the shell 26 in two sections, each including two flanges 30 arranged in abutting relation with the flanges 30 on the other section. These flanges are provided with aligned openings for the reception of bolts 32 for drawing the flanges firmly together and connecting the sections into a unitary structure.

The cylinders of the engine are mounted on the plate 24, as indicated generally at 34 in Fig. 1. The cylinders 36, 38, 40, 42, and 44 are in the nature of tubular extensions cast integrally with the plate 24. The greater portions of the cylinders are enclosed by water jackets 46, and the upper ends of the cylinders support a head 48 which includes a water jacket 50. In the instant case, I have illustrated an engine with five cylinders. The head 48 is connected with the cylinder block in any conventional manner, as by bolts 52.

Each of the cylinders includes a piston 54 having a piston rod 56 connected therewith. The lower ends of the piston rods terminate in reaches 58 having bores 60 loosely embracing bolts 62. Each rod 56 is provided with two reaches 58 slidably connected with two bolts 62 (see Fig. 11). In Fig. 1, the bolts 62 are illustrated as being provided with reduced shanks 64 which are threaded for the reception of nuts 66. The shoulders 68 on the bolts 62 abut the plates 22 and 24 and operate to hold the plates in spaced relation.

Each piston rod 56 carries a pin 70 arranged to operate within a groove 72 in the rotor 74. The groove 72 is continuous and is arranged in crossed relation, as illustrated in Fig. 1, and encircles the rotor twice. The rotor 74 is rotatably mounted within the stator or base structure 20, so that the rotor will be caused to rotate when the pistons 54 are operated.

Plate 22 is provided with a bearing 76 for rotatably supporting a power take off shaft 78, while the plate 24 is provided with a bearing 80 for rotatably supporting a shaft 82, which in turn is connected with a shaft 84 for operating the distributor 86 through the medium of gears 88 and 90.

Upon the upper end of the rotor 74 I mount a cam gear 92 which includes a hub 94 loosely mounted on the shaft 82. The cam gear 92 is integrally connected with the hub 94 through the medium of a web 96 upon which a pair of intake valve cams 98 is mounted. Two exhaust valve cams 102 are provided on the flange 100 carried by the cam gear 92. I provide the plate 24 with a plurality of bored extensions 104 and 106 which slidably support push rods 108 and 110, respectively. The push rods 108 are associated with the valve stems 112 connected with the intake valves 114, while the push rods 110 are associated with the valve stems 116 associated with the exhaust valves 118. Valve stems 112 and 116 are provided with conventional spring means 120 for urging the valves to a closed position.

The intake valves 114 are opened by the cams 98 when brought into lifting relation with the push rods 108, while the exhaust valves 118 are opened when the cams 102 are brought into lifting relation with the push rods 110. During one rotation of the rotor 74, the cam gear 92 rotates through 90° in the opposite direction. Rotation of the cam gear 92 is attained through the medium of a gear 122 keyed to the shaft 82 and arranged in mesh with a gear 124 rotatably mounted on a shaft 126. Gear 124 is integrally connected with a gear 128 arranged in mesh with the cam gear 92.

I provide one end of the shaft 126 with a flange 130 which lies loosely within the recess in one end of the gear 128. The opposite end of the shaft terminates in a threaded shank 132 which extends through a bore in the plate 24 for the reception of a nut 134. The reduced shank 132 provides a shoulder on the shaft 126 which is drawn firmly against the plate 24 for connecting purposes.

In Fig. 9, I illustrate the rotor 74, the pistons 54, and the cylinders diagrammatically. I have indicated an engine of the four-cycle type. The firing order with respect to the cylinders is 36, 40, 44, 38, and 42. In this view, piston 54 of cylinder 44 is just entering the power phase of the groove 72. The piston associated with cylinder 36 is completing its delivery of power to the rotor, while the piston associated with cylinder 40 has completed approximately one-half its power delivery. The declining reach 136 of the groove 72 is of such length as to permit the pistons to deliver power to the rotor 74 through 300° of its rotation. The direction of rotation is indicated by the arrow 138.

The pin 70 associated with the cylinder 36 passes from the declining reach 136 into the ascending reach 140 of the groove 72, which represents the exhaust phase. The exhaust phase continues through 180° of rotation of the rotor 74, or 45° rotation of the cam gear. The cams 98 and 102 are so situated and of such proportions as to operate the intake and exhaust valves in timed relation with the different reaches of the groove 72. Reach 140 is of such length as to make the exhaust effective through 180° rotation of the rotor 74, or 45° rotation of the cam gear 92. As the pin 70 continues moving up the reach 140, it crosses the reach 136 and continues until the exhaust phase has been completed, at which time it enters the declining reach 142, which represents the intake phase. The intake phase continues through 120° rotation of the rotor 74, or 30° rotation of the cam gear. After the pin 70 has passed beyond the reach 142, it enters the ascending reach 144, which represents the compression phase. The compression phase continues through 120° rotation of the rotor 74, or 30° rotation of the cam gear. From the reach 144, the pin 70 passes into the reach 136 to continue another cycle of travel as the rotor completes two revolutions.

Figure 2:
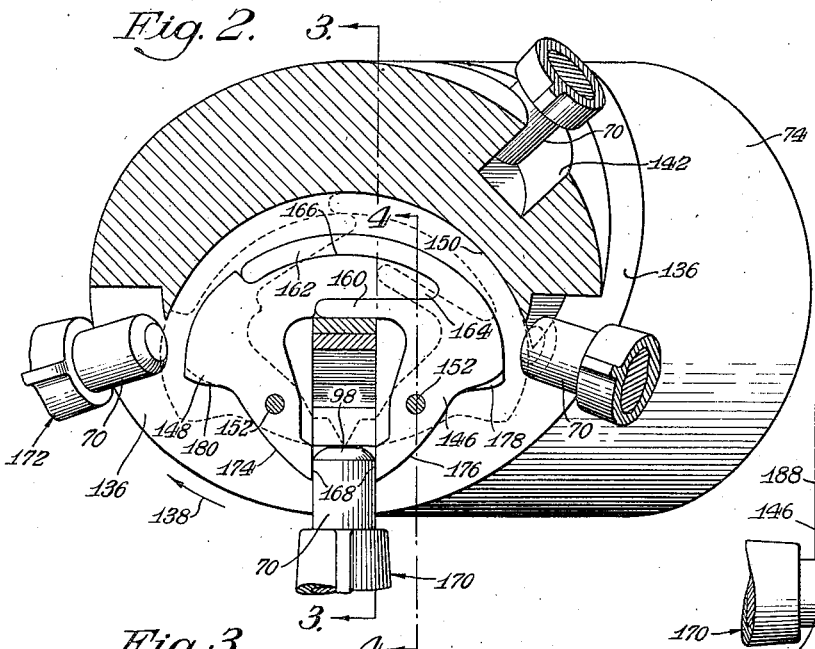
Fig. 2 is a sectional view along the line 2—2 of Fig. 1.
Figure 4:
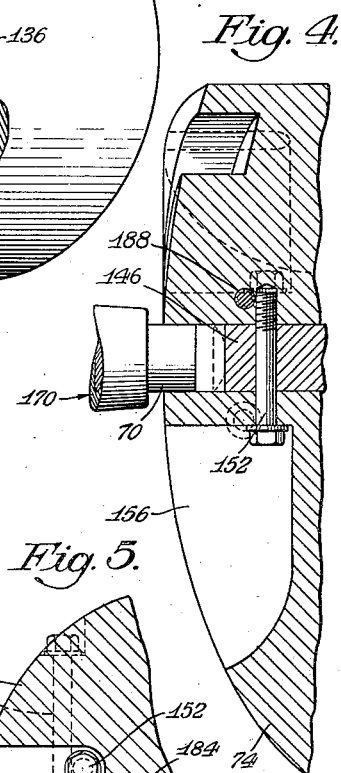
Fig. 4 is a sectional view along the line 4—4 of Fig. 2.

An additional important feature in my invention resides in the provision of means for controlling the movement of the pins 70 as they travel across the reaches 136 and 140. The reaches 136 and 140 are arranged substantially at right angles at the point of intersection. Figs. 2 to 5 illustrate the specific structure of the crossover mechanisms for the reaches 136 and 140 which provide continuity for each reach as the pins 70 move therein. Fig. 2 illustrates the crossover mechanism associated with the reach 136 for lending continuity to the reach 140 at its intersection with the reach 136. This mechanism comprises two cam elements 146 and 148 lying within a recess 150 in the rotor. Each cam element is pivotally mounted upon a bolt 152 which is positioned at right angles to the reach 136. In Fig. 1, I have illustrated the rotor as being cut away at 154 and 156 to permit placement of the bolts 152 which have threaded relation with the rotor, as indicated at 158 in Fig. 4.

The cam element 146 includes two spaced fingers 160 and 162, while the cam element 148 includes one finger 164. In the position of Fig. 2, the finger 164 lies between the fingers 160 and 162, while the finger 164 includes a curvature 166 conforming to the curvature of the finger 162. The curved relation between the fingers 162 and 164 is such that the cam elements 146 and 148 may be moved to the dotted line position of Fig. 2 about the pins 152 as axes. In the full line position of Fig. 2, the faces 168 of the cam elements 146 and 148 as so positioned as to have guiding relation with the pin 70 positioned therebetween, which pin is travelling in an ascending direction in the reach 140. The faces 168 are aligned with the walls of the reach 140 so as to provide continuity for the pin, thereby preventing accidental shifting of the pin into the reach 136.

As the rotor 74 continues its rotation, the pin 70 in the position 170 moves beyond the faces 168, and the pin 70 in the position 172 approaches the cam elements. As the pin in the position 172 advances toward the cam element 148, the end of the pin will engage the cam surface 174 and pivot the cam element 148 to its dotted line illustration of Fig. 2. Any pivotal movement of the cam element 148 imparts a corresponding pivotal movement to the cam element 146 because of the relation between the fingers 162 and 164.

In the dotted line position of the cam elements 146 and 148 of Fig. 2, the ends 174 are so positioned as to permit the pin 70 of the 172 position to pass freely thereover. As the pin 70 passes over the cam surface 176 on the cam element 146, it will be moved into abutting relation with the cam surface 178 on the element 146 and move the element to the full line position of Fig. 2. Thus, the two cam elements 146 and 148 are adjusted to have guiding relation with the succeeding pin 70 moving upwardly in the reach 140. Cam element 148 is provided with a cam surface 180 corresponding to the cam surface 178 which functions only in case the engine back fires.

Reach 140 of the groove 72 is provided with two cam elements 182 and 184 of the same construction as the cam elements 146 and 148. Cam elements 182 and 184 are arranged substantially at right angles to the cam elements 146 and 148 and are housed within a recess 186 in the rotor 74. Bolts 188 provide pivotal mounting for the elements 182 and 184, which bolts are anchored in the rotor in the same manner as the bolt 152.

Figure 3:
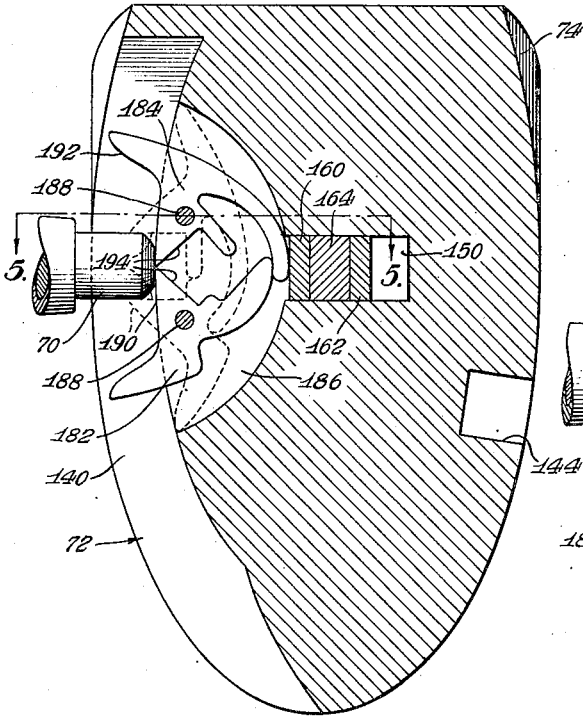
Fig. 3 is a sectional view along the line 3—3 of Fig. 2.
Figure 5:
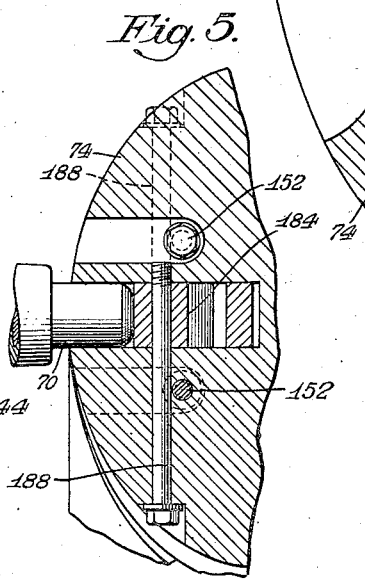
Fig. 5 is a sectional view along the line 5—5 of Fig. 3.

Fig. 3 illustrates the relation of the cam elements 182 and 184 to the pin 70 in the position 170. As the pin 170 moves upwardly in the reach 140, the end of the pin engages the cam surface 190 on the element 182 while in its dotted line position and pivots the element to the full line position of Fig. 3. Such pivotal movement of the element 182 imparts a corresponding pivotal movement to the element 184 so that both will take the dotted line position of Fig. 3. As the pin 170 moves upwardly within the reach 140, the end of the pin engages the cam surface 192 on the element 184 which moves the elements to the dotted line of Fig. 3. In this position, the faces 194 are aligned with the walls of the reach 136 so as to provide a guiding function for the succeeding pin 70 as it travels down the reach 136 across the reach 140. The cam elements 182 and 184 operate in the same manner as the cam elements 146 and 148. Because of the cam elements 146, 148, 182, and 184 the pins 170 are prevented from accidentally shifting into either of the reaches 136 or 140 during the cross over period.

Figure 6:
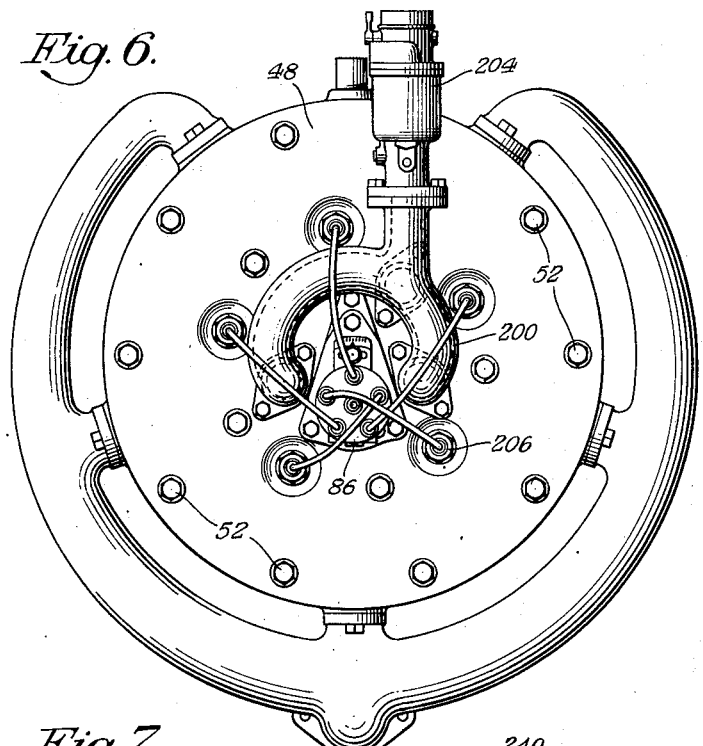
Fig. 6 is a top plan view of the engine.
Figure 7:
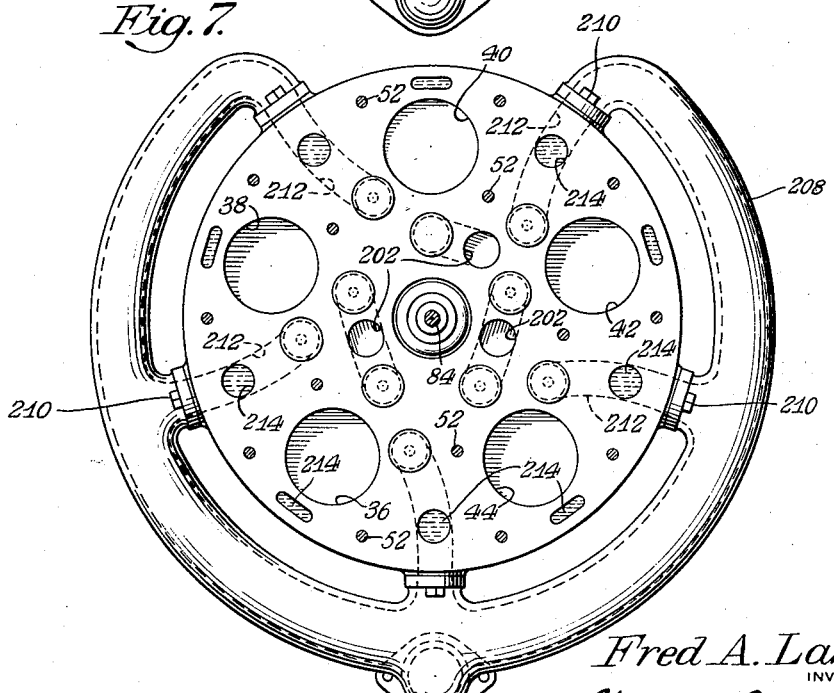
Fig. 7 is a view taken along the line 7—7 of Fig. 1.

In Figs. 1 and 6, I illustrate the engine as being provided with an intake manifold 200 for delivering fuel to the porch 202 communicating with the intake valves 114. The conventional carburetor 204 is connected with the intake manifold 200. Conventional spark plugs 206 are integrally connected with the distributor 86. The exhaust manifold 208 is bolted to the engine at 210 and communicates with porch 212, which in turn communicates with the exhaust valve 118. Openings 214 are provided in the head 48 and the cylinder block for establishing communication between the water jackets 46 and 50. The engine block is provided with a plurality of openings 216 normally closed by covers 218 through the medium of screws 220. These covers may be removed to permit access to the area about the plate 24. I provide the shell 26 with a plurality of openings 22 which are normally closed by covers 224 through the medium of screws 226.

In my invention each piston delivers power to the rotor 74 through 300° of rotation during each second revolution. In this way, I attain a highly efficient engine in that power is applied to the rotor substantially throughout its complete revolution. The cross over mechanism protects the pins 70 in such a manner as to prevent accidental shifting into the wrong groove. While I have illustrated the engine as embodying five cylinders, it will be understood that the invention is clearly applicable to engines embodying a different number of cylinders. I prefer to arrange the exhaust valve cams in such a manner as to open the exhaust valve 30° before the pins 70 reach bottom dead center, thus reducing the pressure in the cylinder to atmospheric pressure.

Without further elaboration, the foregoing will so fully explain my invention that others may, by applying current knowledge, readily adapt the same for use under various conditions of service.

I claim:

1. In an internal combustion engine having a plurality of cylinders and a piston in each cylinder, a rotor in the nature of a cylinder having a continuous groove in its peripheral face extending twice about the rotor, the groove being fashioned to provide intake, compression, power and exhaust runs, with two runs intersecting, each piston having a connecting rod provided with a rotor connection riding in said groove, means for guiding the piston rods and the rotor connections for reciprocation in paths paralleling the axis of rotation of the rotor, said rotor connections passing alternately through the two intersecting runs, and means carried by the rotor at the intersection of said two runs and actuated by the rotor connections for alternately closing the runs at their point of intersection to lend alternate continuity to the runs for positively guiding each rotor connection in its passage through its respective run.

2. In an internal combustion engine having a plurality of cylinders and a piston in each cylinder, a rotor in the nature of a cylinder having a continuous groove in its peripheral face extending twice about the rotor, the groove being fashioned to provide intake, compression, power and exhaust runs, with two runs intersecting, each piston having a connecting rod provided with a rotor connection riding in said groove, means for guiding the piston rods and the rotor connections for reciprocation in paths paralleling the axis of rotation of the rotor, said rotor connections passing alternately through the two intersecting runs, and a pair of crossover cam elements associated with each of said two runs at their point of intersection having guide faces arranged to define continuations of the walls of the runs at the point of intersection, said crossover cam elements being actuated by the rotor connections for alternately bringing the guide faces into operating positions to lend alternate continuity to the runs for positively guiding each rotor connection in its passage through its respective run.

3. In an internal combustion engine having a plurality of cylinders and a piston in each cylinder, a rotor in the nature of a cylinder having a continuous groove in its peripheral face extending twice about the rotor, the groove being fashioned to provide intake, compression, power and exhaust runs, with two runs intersecting, each piston having a connecting rod provided with a rotor connection riding in said groove, means for guiding the piston rods and the rotor connections for reciprocation in paths paralleling the axis of rotation of the rotor, said rotor connections passing alternately through the two intersecting runs, crossover cam elements carried by the rotor and lying in one of said runs to be actuated by the rotor connections passing therethrough for lending continuity to the other run at the point of intersection, and crossover cam elements carried by the rotor and lying in the other of said two runs to be actuated by rotor connections passing therethrough for lending continuity to said first one run, said two groups of crossover cam elements being alternately actuated by the rotor connections so as to lend alternate continuity to the two runs for positively guiding each rotor connection in its passage through its respective run at the point of intersection of the runs.

4. In an internal combustion engine having a cylinder and a piston operating in the cylinder, a rotor in the nature of cylinder having a continuous groove in its peripheral face extending twice about the rotor, the groove being fashioned to provide intake, compression, power and exhaust runs, with two runs intersecting, said piston having a connecting rod provided with a rotor connection riding in said groove, means for guiding the piston rod and its rotor connection for reciprocation in a path paralleling the axis of rotation of the rotor, said rotor connection passing alternately through the two intersecting runs, and means carried by the rotor at the point of interection of said two runs and actuated by the rotor connection for alternately closing the runs at their point of intersection to lend alternate continuity to the runs for positively guiding the rotor connection in its alternate passage through said two runs.

5. In an internal combustion engine having a cylinder and a piston operating in the cylinder, a rotor in the nature of a cylinder having a continuous groove in its peripheral face extending twice about the rotor, the groove being fashioned to provide intake, compression, power and exhaust runs, with two runs intersecting, said piston having a connecting rod provided with a rotor connection riding in said groove, means for guiding the piston rod and its rotor connection for reciprocation in a path paralleling the axis of rotation of the rotor, said rotor connection passing alternately through the two intersecting runs, and a pair of crossover cam elements carried by the rotor and associated with each of said two runs at their point of intersection having guide faces arranged to define continuations of the walls of the runs at their point of intersection, said crossover cam elements being actuated by the rotor connection for alternately bringing the guide faces into operating positions to lend alternate continuity to the runs for positively guiding the rotor connection in its alternate passage through said two runs.

FRED A. LANE.